United States Patent [19]

Perkins

[11] Patent Number: 4,638,491

[45] Date of Patent: Jan. 20, 1987

[54] METHOD FOR PROTECTING THE HEATING ELECTRODES OF GLASS MELTING FURNACES

[75] Inventor: Richard A. Perkins, Newark, Ohio

[73] Assignee: Owens-Corning Fiberglas Corporation, Toledo, Ohio

[21] Appl. No.: 263,440

[22] Filed: May 14, 1981

[51] Int. Cl.⁴ .................................................. C03B 5/027
[52] U.S. Cl. ......................................... 373/39; 373/41
[58] Field of Search ................... 373/39, 40, 41, 120, 373/125, 122

[56] References Cited

U.S. PATENT DOCUMENTS 2,855,450 10/1958 Eden .................................... 373/39

Primary Examiner—Roy N. Envall, Jr.
Attorney, Agent, or Firm—Ronald C. Hudgens; Patrick P. Pacella

[57] ABSTRACT

Disclosed is a method for protecting the heating electrodes of glass melting furnaces by applying a DC potential to various electrodes of the furnace. The DC current is applied to the heating electrodes through counter electrodes or anodes. The method of this invention not only reduces the corrosion of the heating electrodes but also reduces the corrosion of the counter electrodes.

1 Claim, 1 Drawing Figure

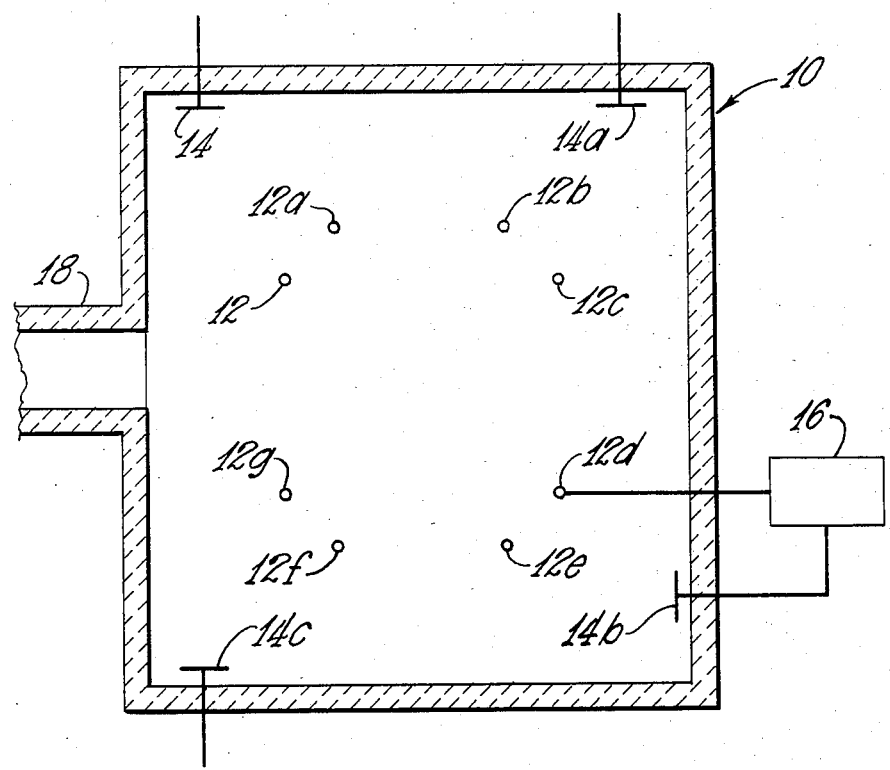

METHOD FOR PROTECTING THE HEATING ELECTRODES OF GLASS MELTING FURNACES

TECHNICAL FIELD

This invention relates to a method for protecting the heating electrodes of glass melting furnaces by applying a DC electrolytic potential to various electrodes of the furnace.

BACKGROUND ART

The corrosion of molybdenum electrodes in an electric-fired glass melting furnace is generally one of the limiting factors in determining the campaign life of such a furnace. Premature failure of the electrodes necessitates their replacement or a furnace rebuild. DC biasing has been proposed as a means for protecting the heating electrodes in a furnace, especially with the more corrosive glasses. Generally, a source of alternating current is connected to the electrodes for heating and a source of direct current is employed for applying a negative potential to the electrodes. One or several additional electrodes, which act as anodes, are inserted into the furnace for applying the negative potential. These anodes are preferably made of materials which are as insensitive to oxidation as possible, such as platinum. U.S. Pat. No. 2,855,450, issued on Oct. 7, 1958 to Carsten Eden, discloses one arrangement for doing this.

These and other attempts have been made to overcome the effects of cations and anions on the heating electrodes of a glass melting furnace. One item left unsolved by these attemps, however, has been both the protection of the molybdenum heating electrodes and the protection of the platinum anodes.

DISCLOSURE OF INVENTION

I have developed a method that not only reduces the corrosion rate of the molybdenum electrodes by cathodic protection, but also holds the corrosion rate for the platinum counter electrodes to a minimum. I do this by establishing the corrosion current density for molybdenum corrosion in molten glass, establishing the concentration polarization limit for platinum in molten glass and maintaining the current density (amperes per square centimeter of electrode surface) slightly above the corrosion current for molybdenum and well below the concentration polarization limit of platinum. In addition to extended furnace life, a significant savings in precious metal is achieved.

BRIEF DESCRIPTION OF THE DRAWING

The FIGURE is a schematic view of an electric melting furnace for carrying out the method of this invention.

BEST MODE OF CARRYING OUT INVENTION

My invention provides a flexible method of adjusting current which requires an awareness of what takes place during electrode corrosion and provides an optimum current that will reduce platinum loss. Referring to the drawing, the numeral 10 indicates the glass melting furnace. Through the bottom of furnace 10 and into the melting zone project heating electrodes 12. Counter electrodes 14 are inserted over the side of furnace 10 and extend into the melting zone. All electrodes are submerged into the molten glass during normal operation. Counter electrode 14b is connected to the appropriate circuitry 16 for supplying DC voltage, yet choking out AC voltage. Throat 18 is for flowing molten glass away from the melting zone of furnace 10.

The cathodic protection of molybdenum electrodes is accomplished by applying a cathodic DC bias to the electrodes while they are firing with an AC current. There must be an anode material somewhere in the vicinity of the electrode to complete the DC circuit. The anode material could be a refractory or a noble metal. At present platinum counter electrodes will be used which can be inserted over the side of the tank. With the appropriate circuitry, the AC current will be prevented from passing to the counter electrode. When in place the cathodic protection system can be easily turned on or off without altering the firing pattern of the furnace. The optimum design would employ a centrally located counter electrode in a furnace which would be connected to each set of electrodes. The DC bias will offset the sinusoidal wave of the AC current to the cathodic side of the corrosion potential causing a net cathodic polarization which will reduce the molybdenum corrosion rate.

The corrosion of molybdenum in molten glass is a cathodically controlled process (the rate limiting step is transport of oxidant [iron oxide and sulfate] to the electrode surface). This was determined from a comparison of molybdenum corrosion rates and corrosion potential to a platinum cathodic polarization curve for the glass. The corrosion current for molybdenum corrosion in AF glass at 1500° C. is about 0.9 ma/cm$^2$ as determined in laboratory studies. The MoO$_3$ content in glass from a furnace indicates the rate of corrosion of the molybdenum electrodes. For the furnace where the following example was run, the effective corrosion current was 0.75 ma/cm$^2$. Because the corrosion process is cathodically controlled, for cathodic protection a current density only slightly higher than the corrosion current need be applied to the electrode, i.e., a DC current somewhat greater than 0.75 ma/cm$^2$. Thus, the required current density can be adjusted for furnaces and glass compositions depending upon the electrode consumption rate. Generally, the corrosion current density ranges from 0.1 to 3.0 ma/cm$^2$. Preferably, it ranges from 0.5 to 2.0 ma/cm$^2$.

The best anode material for applying the cathodic bias to the electrodes is platinum. An anodic polarization curve for platinum in AF glass was run at 1300° C. A large increase in the current density was seen at +0.6 v due to the oxidation of oxygen ions to form molecular oxygen. At about +1.0 v the current density was 30 ma/cm$^2$. Thus, the area of the platinum anode could be much smaller than that of the heating electrode area. The corrosion of platinum in molten glass in the presence of an electrical current occurs by oxidation due to the oxygen liberated at the platinum surface. Therefore, the current density at the platinum should be maintained well below the concentration polarization limit (the current density at which the platinum would be completely covered with oxygen gas), which is about 500–1000 ma/cm$^2$, to reduce the platinum corrosion rate. In addition, the oxidation rate is a function of the temperature. Therefore, cooling the counter electrode also will reduce the platinum corrosion rate.

The effects of anodic current density and temperature upon the corrosion rate of platinum are given below for measurements in reduced wool glass.

| Material | Temperature (°C.) | Current Density (ma/cm$^2$) | Recession Rate (cm/yr) |
|---|---|---|---|
| Platinum | 1300 | 10 | .038 |
| Platinum | 1300 | 25 | .076 |
| Platinum | 1200 | 10 | .026 |
| Platinum | 1100 | 10 | .0027 |

The corrosion rate at 1300° C. is quite dependent upon the anodic current density. However, as the temperature decreases, the corrosion rate drops quite sharply. At 1100° C. the recession rate is very small. Thus the best solution for the counter electrodes would be platinum electrodes which are inserted in a relatively cool portion of the furnace and also water cooled.

INDUSTRIAL APPLICABILITY

A method has been devised to reduce the corrosion rate of molybdenum in molten glass at elevated temperatures. An AC current was applied to several specimens with a current density of about one amp/cm$^2$. This is similar to the current density on furnace electrodes. The corrosion rates for the specimens protected with a cathodic DC bias were considerably reduced from those for the unprotected ones.

Because the protection system seemed to be effective in laboratory tests, a field trial of the system in a furnace was initiated.

A field trial of the cathodic protection system was designed for a small furnace with four parts of electrodes. For simplification, a counter electrode was made for each firing pair, and four power supplies were designed and built. The corrosion rate of the molybdenum electrodes was monitored by analyzing for the MoO$_3$ content of the glass from the furnace. The counter electrodes were simply suspended over the sides of the tank into the glass. The trial consisted of three segments, (1) the system was activated to determine the response of the electrode corrosion rate; (2) the system was turned off to determine if furnace conditions returned to normal; and (3) the system was reactivated to see if the response of Segment #1 could be duplicated. A baseline period of about two months before Segment #1 was also monitored for MoO$_3$ content.

The corrosion rate of the electrodes has been monitored by determining the MoO$_3$ content of the glass. Due to some problems which have occurred, the trial was started with only six electrodes protected, and after five days, only four electrodes were protected. The MoO$_3$ content of the glass for three months prior to applying the system was about 10 parts per million (ppm). When six of the electrodes were protected, the MoO$_3$ content decreased rapidly to 2–3 ppm. The MoO$_3$ content then increased to about 5 ppm when only four of the electrodes were protected. Thus, the MoO$_3$ content is generally proportional to the number of electrodes which are left unprotected. Finally, when the system was turned off, the MoO$_3$ content increased quickly back up to 10–11 ppm which is the level measured before the system was turned on. It is apparent that the protection system is an effective method of reducing electrode corrosion. This behavior was reproduced in the third segment of the trial.

The weight loss of the Pt counter electrodes was measured after the termination of the trial. The recession rate for the counter electrodes was about 5 mil/yr. if the total immersion time of the plates is considered. However, if the losses are considered to occur only when the EPS was operating, the recession rate would be about 10 mil/yr. The latter value is more appropriate and will be used for design considerations. This rate of alloy recession would cost $21M per year if only four counter electrodes are required and $42M per year if eight are required. Thus this loss may be significant. If the platinum electrodes are permanently installed in the bottom of the furnace and are cooled, the platinum loss will be significantly reduced. An optimum temperature of 1100° C. reduces the platinum loss while retaining a sufficient glass conductivity and fluidity to avoid concentration polarization at the surface.

What is claimed is:

1. A method of operating an electric melting furnace containing a body of molten material and having heating electrodes immersed in the molten material comprising the steps of:
    (a) applying a source of alternating current to the heating electrodes;
    (b) immersing at least one counter electrode in the molten material;
    (c) applying a source of direct current between the counter electrodes and heating electrodes;
    (d) establishing a corrosion current density for the heating electrodes measured in units of amperes per square centimeter of electrode surface; and
    (e) establishing a concentration polarization limit for the counter electrode measured in units of amperes per square centimeter of electrode surface; and
    (f) maintaining a current density at the heating electrodes that is slightly above the corrosion current density of step (d) and maintaining a current density at the counter electrodes that is well below the concentration polarization limit of step (e) wherein the heating electrodes have a large surface area in comparison to the surface area of the counter electrodes and wherein the counter electrodes have a small surface area in comparison to the surface area of the heating electrodes.

* * * * *